(12) United States Patent
Hwang et al.

(10) Patent No.: US 11,852,664 B2
(45) Date of Patent: Dec. 26, 2023

(54) POWER METERING APPARATUS, POWER METERING SERVER, AND POWER METERING METHOD BASED ON BLOCKCHAIN

(71) Applicant: Electronics and Telecommunications Research Institute, Daejeon (KR)

(72) Inventors: Tae in Hwang, Daejeon (KR); Il Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 306 days.

(21) Appl. No.: 17/177,577

(22) Filed: Feb. 17, 2021

(65) Prior Publication Data

US 2021/0263083 A1 Aug. 26, 2021

(30) Foreign Application Priority Data

Feb. 24, 2020 (KR) .................. 10-2020-0022486

(51) Int. Cl.
*G01R 22/06* (2006.01)
*G06F 21/60* (2013.01)
(Continued)

(52) U.S. Cl.
CPC ......... *G01R 22/066* (2013.01); *G01R 22/063* (2013.01); *G06F 16/275* (2019.01);
(Continued)

(58) Field of Classification Search
CPC .. G06Q 20/401; G06Q 20/4016; G06Q 50/06; H04L 9/3236; H04L 9/3239;
(Continued)

(56) References Cited

U.S. PATENT DOCUMENTS

| | | | |
|---|---|---|---|
| 2005/0033701 A1* | 2/2005 | Challener | G06Q 50/06 700/286 |
| 2011/0099367 A1* | 4/2011 | Thom | H04L 9/3247 713/181 |

(Continued)

FOREIGN PATENT DOCUMENTS

| | | |
|---|---|---|
| KR | 10-1942543 B1 | 1/2019 |
| KR | 10-1954590 B1 | 3/2019 |

(Continued)

*Primary Examiner* — Huy Q Phan
*Assistant Examiner* — David B Frederiksen
(74) *Attorney, Agent, or Firm* — NSIP Law

(57) ABSTRACT

A power metering apparatus, a power metering server, and a power metering method based on a blockchain are disclosed. Particularly, in order to simultaneously assure integrity and transparency of power metering data based on a blockchain, power metering data generated by measuring an amount of power generated by an energy source and a unique key are stored in a database linked to a power metering server, and a digitally signed hash value of the power metering data is stored in a blockchain node. Accordingly, disclosed are blockchain-based power metering system and method for preventing forgery and tampering of power metering data, solving a problem associated with a blockchain storage capacity that may occur when storing the power metering data, and protecting sensitive information on the power metering data.

14 Claims, 6 Drawing Sheets

(51) Int. Cl.
*H04L 9/32* (2006.01)
*G06F 16/27* (2019.01)
*G06Q 50/06* (2012.01)
*G06Q 20/14* (2012.01)
*H04L 9/00* (2022.01)

(52) U.S. Cl.
CPC ......... *G06F 21/602* (2013.01); *G06Q 20/145* (2013.01); *G06Q 50/06* (2013.01); *H04L 9/3239* (2013.01); *H04L 9/3247* (2013.01); *H04L 9/50* (2022.05); *H04L 2209/56* (2013.01)

(58) Field of Classification Search
CPC ..... H04L 9/3242; H04L 9/3247; G06F 21/62; G06F 21/6218; G01R 22/06; G01R 22/061; G01R 22/063; G01R 22/066
See application file for complete search history.

(56) References Cited

U.S. PATENT DOCUMENTS

| | | | |
|---|---|---|---|
| 2017/0358041 A1* | 12/2017 | Forbes, Jr. | G05D 3/12 |
| 2018/0130130 A1* | 5/2018 | Dechu | G06Q 50/06 |
| 2019/0050949 A1* | 2/2019 | Orsini | H02J 3/381 |
| 2019/0086235 A1* | 3/2019 | Cui | H04W 4/021 |
| 2019/0182029 A1 | 6/2019 | Yim et al. | |
| 2019/0182313 A1 | 6/2019 | Yoo et al. | |
| 2019/0236726 A1* | 8/2019 | Unagami | H04L 9/30 |
| 2019/0353685 A1* | 11/2019 | Almeida Cavoto | G06Q 20/145 |
| 2020/0005264 A1* | 1/2020 | Patterson | G06Q 20/0855 |
| 2020/0067708 A1* | 2/2020 | Subba | H04L 9/0861 |

FOREIGN PATENT DOCUMENTS

| | | |
|---|---|---|
| KR | 10-2019-0055666 A | 5/2019 |
| KR | 10-2019-0059491 A | 5/2019 |
| KR | 10-1976401 B1 | 5/2019 |
| KR | 10-2019-0077765 A | 7/2019 |
| KR | 10-2054256 B1 | 12/2019 |

\* cited by examiner

POWER METERING APPARATUS, POWER METERING SERVER, AND POWER METERING METHOD BASED ON BLOCKCHAIN

CROSS-REFERENCE TO RELATED APPLICATION(S)

This application claims the benefit of Korean Patent Application No. 10-2020-0022486, filed on Feb. 24, 2020, in the Korean Intellectual Property Office, the disclosure of which is incorporated herein by reference.

BACKGROUND

1. Field of the Invention

Example embodiments relate to a power metering apparatus, a power metering server, and a power metering method based on a blockchain, and more particularly, to an apparatus and method for simultaneously assuring integrity and transparency of blockchain-based power metering data.

2. Description of the Related Art

In a conventional power metering management method, power metering data is managed in a manner of being stored in a power metering server operated by a utility operator. The utility operator is regarded as a reliable institution, however, the power metering server is a centralized system, and thus it is susceptible to a security vulnerability attack such as DDos, and data forgery and tampering of an insider, and it is not possible to provide transparency of the power metering data due to a closed system structure.

In order to solve the above problems, a blockchain technology is being applied to power metering systems. However, a conventional blockchain-based power metering system directly stores power metering data on a blockchain, resulting in problems associated with a blockchain storage capacity and protection of sensitive information on power metering data.

Accordingly, there is a need for a blockchain-based power metering method to solve the conventional problems associated with a blockchain storage capacity and power metering data protection.

SUMMARY

Aspects provide a power metering system and power metering method in which power metering data and a digitally signed hash value for verifying whether the power metering data is authentic are respectively stored in a database of a power metering server and a blockchain node, thereby assuring integrity and transparency of the power metering data.

In addition, aspects provide a power metering system and power metering method in which power metering data and a digitally signed hash value for verifying whether the power metering data is authentic are respectively stored in a database of a power metering server and a blockchain node, thereby preventing forgery and tampering of the power metering data, solving a problem associated with a blockchain storage capacity that may occur when storing the power metering data, and protecting sensitive information on the power metering data.

According to an aspect, there is provided a blockchain-based power metering method performed by a power metering apparatus, the method including generating power metering data by measuring an amount of power generated by an energy source, generating a hash value of the power metering data by using a hash algorithm, generating a digitally signed hash value by applying a confidential key (private key) of the power metering apparatus based on a public-key cryptography to the hash value of the power metering data, transmitting, to a blockchain node, a digitally signed hash value for verifying whether the power metering data is authentic, and transmitting, to a power metering server, the power metering data and a unique key as an original of the measured amount of power generated by the energy source. The unique key, which is a key for querying the digitally signed hash value of the power metering data on a blockchain, may include a power metering apparatus ID and a blockchain transaction ID.

The transmitting to the blockchain node may include extracting one or more digitally signed hash values generated by the power metering apparatus within a preset time period, and transmitting, to the blockchain node, the extracted one or more digitally signed hash values while requesting the blockchain node to store the extracted one or more digitally signed hash values.

The blockchain node may be configured to receive, in response to a request of the power metering apparatus, one or more digitally signed hash values, generate a transaction block including the received one or more digitally signed hash values, and connect and store the generated transaction block.

The transaction block may be managed through a distributed ledger on a blockchain network, and the blockchain network may share a same distributed ledger by allowing the blockchain nodes to propagate and replicate the transaction block to surrounding blockchain nodes.

The transmitting to the power metering server may include extracting one or more pieces of power metering data generated by the power metering apparatus within a preset time period, and transmitting, to the power metering server, the extracted one or more pieces of power metering data and the unique key while requesting the power metering server to store the extracted one or more pieces of power metering data and the unique key.

The power metering server may be configured to store, in response to the request of the power metering apparatus, the power metering data and the unique key received from the power metering apparatus, and verify, when a request for access to the power metering data occurs from a power metering client, a permission to access the power metering data that the power metering client intends to access, and then transmit, to the power metering client, the power metering data for which the permission is verified.

According to another aspect, there is provided a power metering apparatus including a processor. The processor may be configured to generate power metering data by measuring an amount of power generated by an energy source, generate a hash value of the power metering data by using a hash algorithm, generate a digitally signed hash value by applying a confidential key (private key) of the power metering apparatus based on a public-key cryptography to the hash value of the power metering data, transmit, to a blockchain node, a digitally signed hash value for verifying whether the power metering data is authentic, and transmit, to a power metering server, the power metering data and a unique key as an original of the measured amount of power generated by the energy source. The unique key, which is a key for querying the digitally signed hash value of the power metering data on a blockchain, may include a power metering apparatus ID and a blockchain transaction ID.

The processor may be configured to generate, by abbreviating a characteristic of the power metering data, a hash value of the power metering data expressed as a unique value having an encrypted form.

The processor may be configured to perform a blockchain-based digital signature on the hash value so as to verify whether the power metering data is authentic.

The processor may be configured to extract one or more digitally signed hash values generated by the power metering apparatus within a preset time period, and transmit, to the blockchain node, the extracted one or more digitally signed hash values while requesting the blockchain node to store the extracted one or more digitally signed hash values.

The processor may be configured to extract one or more pieces of power metering data generated by the power metering apparatus within a preset time period, and transmit, to the power metering server, the extracted one or more pieces of power metering data and the unique key while requesting the power metering server to store the extracted one or more pieces of power metering data and the unique key.

According to still another aspect, there is provided a blockchain-based power metering method performed by a power metering server, the method including receiving a request for storing power metering data and a unique key from a power metering apparatus, storing, in response to the request, one or more pieces of power metering data generated by the power metering apparatus within a preset time period and the unique key, verifying, when a request for access to the power metering data occurs from a power metering client, a permission to assess the power metering data that the power metering client intends to access, and transmitting, to the power metering client, the power metering data for which the permission is verified.

The verifying of the permission may include requesting a digitally signed hash value corresponding to the power metering data of the power metering apparatus requested by the power metering client, decoding the digitally signed hash value by using a public key of the power metering apparatus provided by the power metering client, and then determining, by comparing the decoded hash value to a hash value of the power metering data, whether the decoded hash value and the hash value of the power metering data match, and determining whether the power metering client is allowed to access the power metering data according to a determination result.

The digitally signed hash value may be included in a transaction block generated by a blockchain node to be managed through a distributed ledger shared by blockchain nodes on a blockchain network.

According to still another aspect, there is provided a power metering system including a power metering apparatus configured to respectively transmit, to a blockchain node and a power metering server, power metering data generated according to an amount of power generated by an energy source and a hash value of the power metering data, the power metering server configured to store the power metering data received from the power metering apparatus and a unique key, a power metering client configured to request access to the power metering data stored in the power metering server, and the blockchain node configured to store, based on a blockchain technique, a digitally signed hash value received from the power metering apparatus.

The power metering apparatus may be configured to generate the power metering data by measuring the amount of power generated by the energy source, generate a digitally signed hash value for verifying whether the power metering data is authentic, and then transmit the generated digitally signed hash value to the blockchain node, and transmit the power metering data and the unique key to the power metering server.

The blockchain node may be configured to receive, in response to a request of the power metering apparatus, one or more digitally signed hash values, generate a transaction block including the received one or more digitally signed hash values, and connect and store the generated transaction block.

The transaction block may be managed through a distributed ledger on a blockchain network, and the blockchain network may share a same distributed ledger by allowing the blockchain nodes to propagate and replicate the transaction block to surrounding blockchain nodes.

The power metering server may be configured to verify, when a request for access to the power metering data occurs from the power metering client, a permission to access the power metering data that the power metering client intends to access, and then transmit, to the power metering client, the power metering data for which the permission is verified.

The power metering client may be configured to request access to the power metering data from the power metering server, manage the power metering data according to a request result; and directly request and secure the digitally signed hash value from the blockchain node by using the unique key received with the power metering data from the power metering server.

Additional aspects of example embodiments will be set forth in part in the description which follows and, in part, will be apparent from the description, or may be learned by practice of the disclosure.

According to aspects, power metering data and a digitally signed hash value for verifying whether the power metering data is authentic may be respectively stored in a database of a power metering server and a blockchain node, thereby assuring integrity and transparency of the power metering data.

According to aspects, power metering data and a digitally signed hash value for verifying whether the power metering data is authentic may be respectively stored in a database of a power metering server and a blockchain node, thereby preventing forgery and tampering of the power metering data, solving a problem associated with a blockchain storage capacity that may occur when storing the power metering data, and protecting sensitive information on the power metering data.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
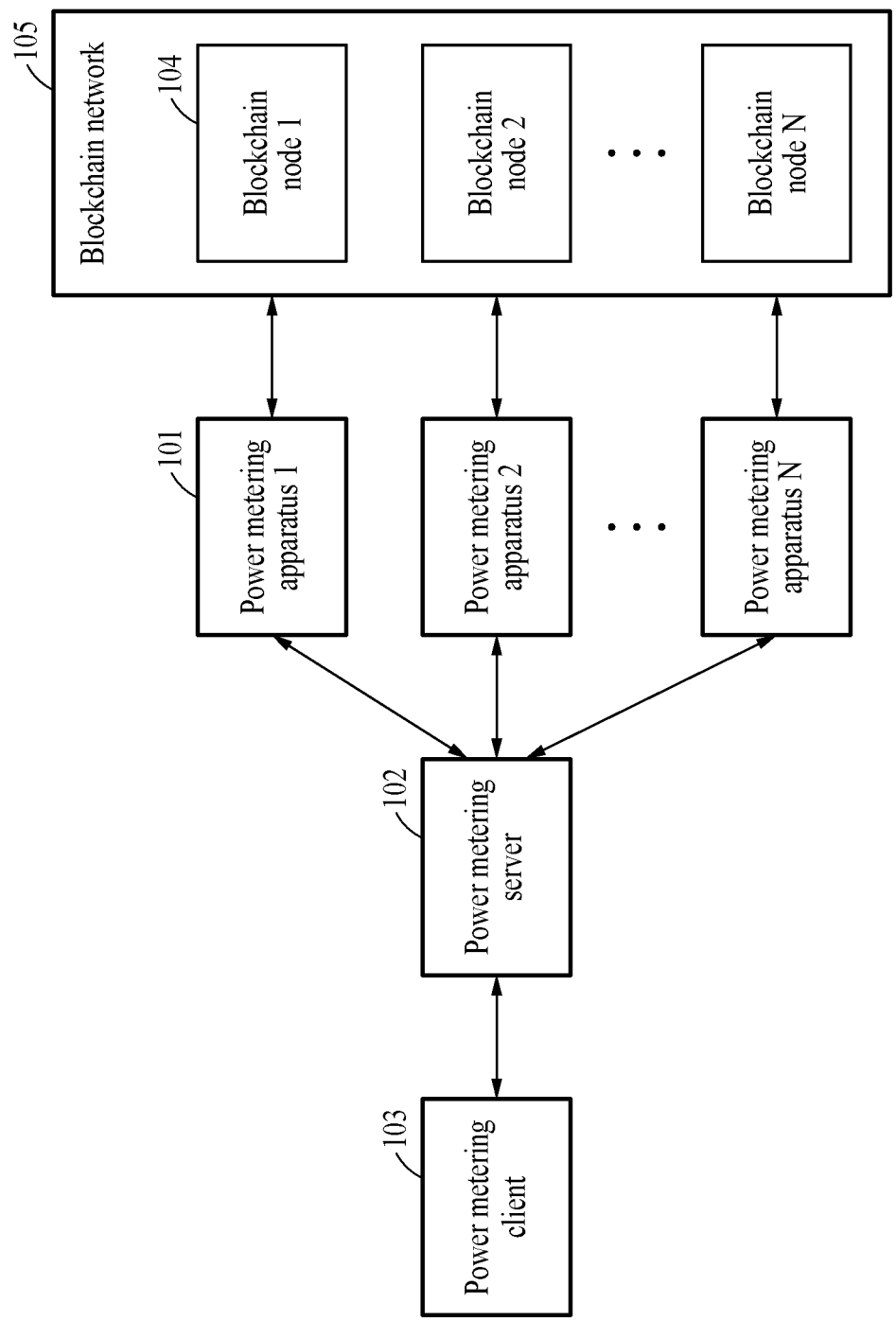
FIG. 1 is a diagram illustrating a blockchain-based power metering system according to an example embodiment.

FIG. 1 is a diagram illustrating a blockchain-based power metering system according to an example embodiment.

Example embodiments relate to a power metering system and method for simultaneously assuring integrity and transparency of power metering data, based on a blockchain. According to example embodiments, a digitally signed hash value of power metering data may be stored in a blockchain, and an original of the power metering data may be stored in a power metering server, thereby preventing forgery and tampering of the power metering data, solving a problem associated with a blockchain storage capacity that may occur when storing the power metering data, and protecting sensitive information on the power metering data.

Referring to FIG. 1, the power metering system may include a power metering apparatus 101, a power metering server 102, a power metering client 103, and a blockchain node 104.

The power metering apparatus 101 may respectively transmit, to a blockchain node and a power metering server, power metering data generated according to an amount of power generated by an energy source and a hash value of the power metering data. In detail, the power metering apparatus 101 may generate power metering data by measuring an amount of generated electricity or an amount of generated power. The power metering apparatus 101 may generate a digitally signed hash value by performing a hash processing operation and a digital signature on the generated power metering data.

The power metering apparatus 101 may request the blockchain node 104 to store and process the digitally signed hash value of the power metering data via a blockchain network 105. The power metering apparatus 101 may transmit the digitally signed hash value to the blockchain node 104.

The power metering apparatus 101 may request the power metering server 102 to store and process the power metering data, and then may transmit, to the power metering server 102, the power metering data and a unique key (a key for querying the digitally signed hash value of the power metering data on a blockchain). Here, the unique key may include information for retrieving the digitally signed hash value on the blockchain, such as a power metering apparatus identifier, a transaction identifier of the digitally signed hash value, and the like.

The power metering server 102 may store the power metering data and the unique key received from the power metering apparatus. In this case, the power metering server 102 may store the power metering data and the unique key in a database (not illustrated) linked to the power metering server 102.

Upon request of the power metering client 103, the power metering server 102 may verify a permission to access the power metering data, and then may provide the power metering data for which the power metering client 103 has requested access.

The power metering client 103 may request the power metering data from a blockchain node 200, and may provide a function of outputting or storing the power metering data. The power metering client 103 may request the power metering data from the power metering server 102, and may request the digitally signed hash value of the power metering data from the blockchain node 200.

In more detail, the power metering client 103 may request the power metering data from the power metering server 102 by using a power metering apparatus ID and a public key to be retrieved.

Upon receiving a request from the power metering client 103, the power metering server 102 may retrieve the unique key by using received information, and may provide power metering data matching the unique key to the power metering client 103.

Before transmitting the retrieved power metering data, the power metering server 102 may secure the digitally signed hash value of the power metering data from the blockchain node 104 by using the unique key, and may verify, through a comparison of hash values, whether the power metering data is authentic, and there is an access permission, and then may transmit the power metering data and the unique key to the power metering client 103. The power metering client 103 may directly request and secure the digitally signed hash value from a blockchain node by using the unique key secured through the above process.

The blockchain node 104 may generate a transaction block including the digitally signed hash value requested by the power metering apparatus 101 to be stored, and may provide a function of verifying and storing the transaction block. In more detail, the power metering apparatus 101 may generate a transaction including the digitally signed hash value, and then may transmit, to the blockchain node, the generated transaction and a digital signature of the generated transaction.

The blockchain node 104 may generate a transaction block, after verifying whether the generated transaction is a transaction generated by the legitimate power metering apparatus 101 by using the received digital signature. The transaction block may be propagated to and shared by different blockchain nodes on a blockchain network, and the blockchain nodes may verify whether the transaction is a valid transaction in the same manner as a verification manner, and then may update a distributed ledger so as to reflect contents of the transaction.

The blockchain network 105 may be a communication network that connects the blockchain nodes 104. The blockchain nodes may share and manage the transaction block associated with the power metering data by using the distributed ledger via the blockchain network 105.

Figure 2:
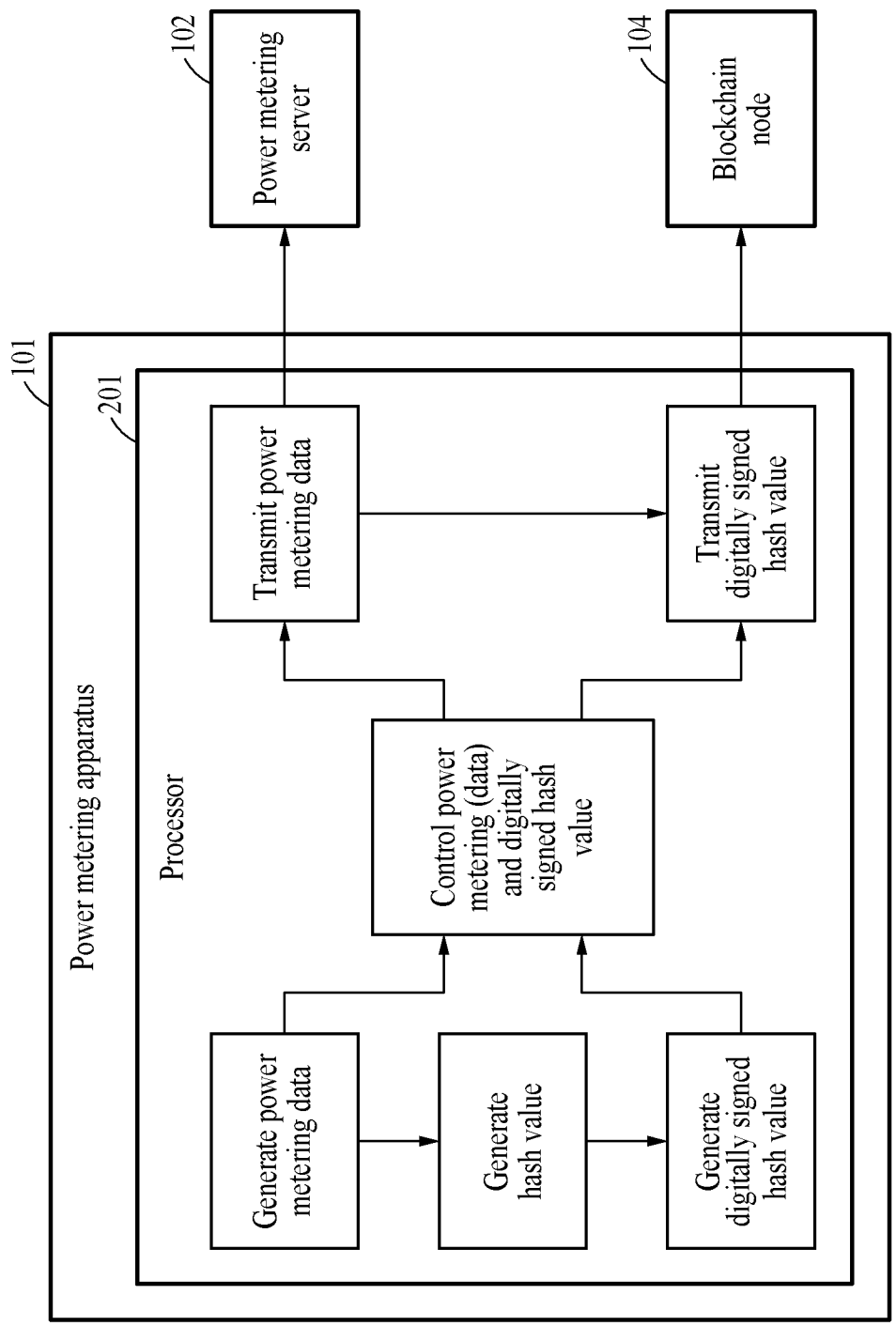
FIG. 2 is a diagram illustrating a detailed operation of a processor of a power metering apparatus according to an example embodiment.

FIG. 2 is a diagram illustrating a detailed operation of a processor of a power metering apparatus according to an example embodiment.

Referring to FIG. 2, the power metering apparatus 101 may include a processor 201, and the processor 201 may respectively transmit, to a database of the power metering server 102 and the blockchain node 104, power metering data and a digitally signed hash value for verifying whether the power metering data is authentic so that the power metering data and the digitally signed hash value are respectively stored in the database of the power metering server 102 and the blockchain node 104.

More specifically, the processor 201 may measure an amount of generated electricity and an amount of generated power associated with an energy source, and may generate the measured value as power metering data. The processor 201 may measure an amount of generated electricity and an amount of generated power within a preset time period, and generate power metering data corresponding to each of measured values. Here, the power metering data may be data indicating a total amount of electricity relative to an amount of power generated by the energy source.

The processor 201 may generate a hash value by applying a cryptographic hash algorithm to the power metering data. The processor 201 may generate a hash value of power metering data generated within a preset time period, based on a cryptographic hash algorithm. The processor 201 may generate a hash value of power metering data associated with an amount of generated power measured within the preset time period, based on a genesis block that is a first block. In conclusion, the processor 201 may generate a hash value connected to previous data while verifying reliability of the power metering data generated within the preset time period. Accordingly, the hash value of the power metering data may include a hash value and a nounce value of power metering data generated before power metering data that is a target for which a hash value needs to be generated.

The processor 201 may generate a digitally signed hash value by applying a public-key cryptography to the generated power metering data. A hash value used for a digital signature may have collision freeness and onewayness in which it is computationally impossible to retrieve a signature text. Accordingly, the processor 201 may digitally sign the hash value by using a public-key cryptography so that the power metering data is verifiable only with assistance of a signer. Accordingly, the processor 201 may generate a digitally signed hash value that satisfies a non-forgery condition, a signer authentication condition, a non-repudiation condition, a non-change condition, and a non-reuse condition.

The processor 201 may include a function of performing control so as to generate and transmit power metering data and a digitally signed hash value at preset time periods.

The processor 201 may provide an interface for communicating with the power metering server 102. The processor 201 may transmit a request for storing power metering data to a power metering server so as to assure integrity and transparency of the power metering data as data of determining an amount of generated power.

The processor 201 may provide an interface for communicating with the blockchain node 104. The processor 201 may transmit, to a blockchain node, a digitally signed hash value for verifying whether power metering data is authentic.

Figure 3:
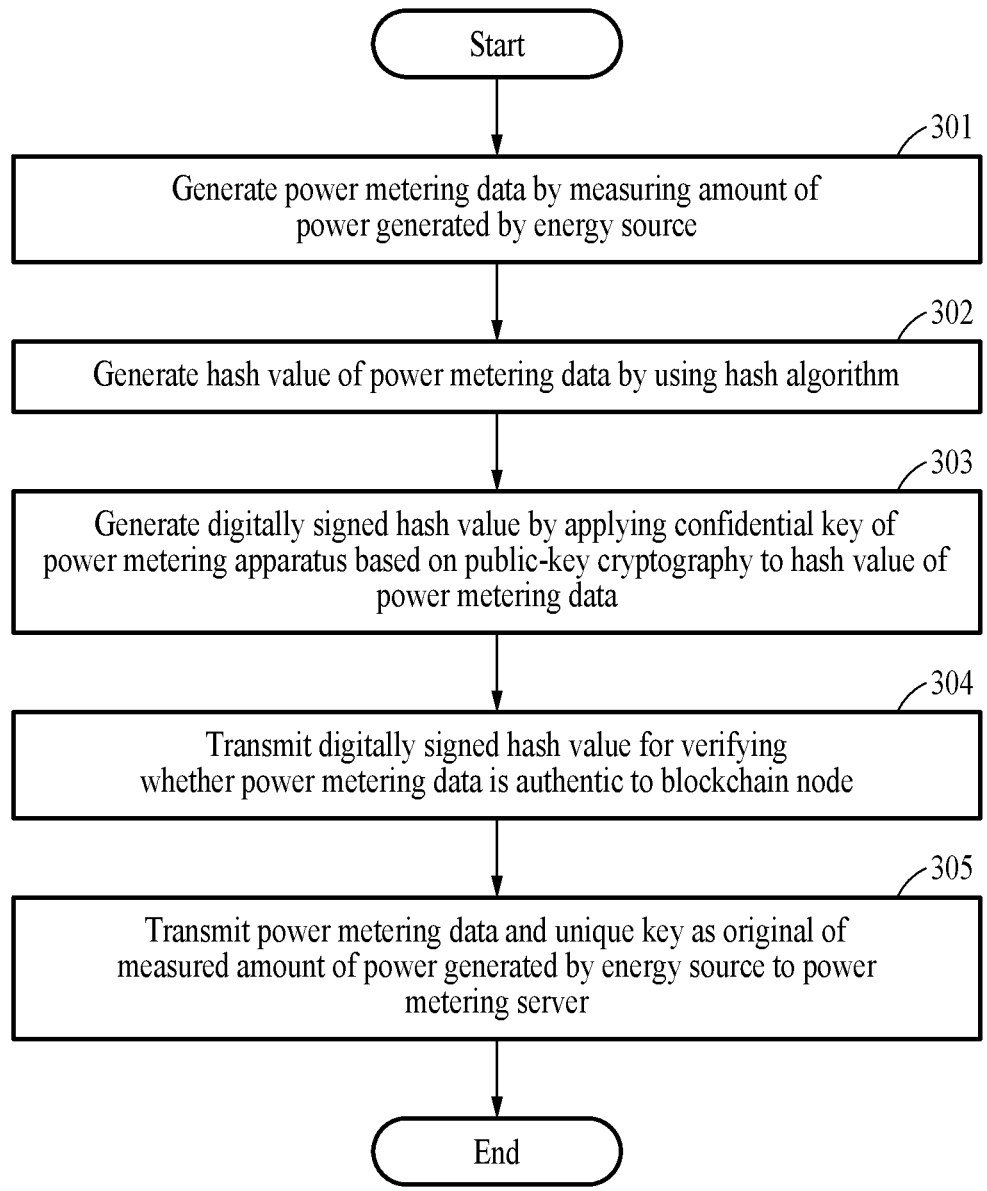
FIG. 3 is a flowchart illustrating a blockchain-based power metering method performed by a power metering apparatus according to an example embodiment.

FIG. 3 is a flowchart illustrating a blockchain-based power metering method performed by a power metering apparatus according to an example embodiment.

Referring to FIG. 3, the power metering apparatus may respectively store, in a database linked to a power metering server and a blockchain node, power metering data and a digitally signed hash value for verifying whether the power metering data is authentic. Accordingly, example embodiments propose a method for assuring integrity and transparency of power metering data while simultaneously solving conventional problems associated with a blockchain storage capacity and protection of sensitive information on the power metering data.

In operation 301, the power metering apparatus may generate power metering data by measuring an amount of power generated by an energy source. In detail, the power metering apparatus may measure an amount of consumed electricity or an amount of generated power. The power metering apparatus may generate the measured amount of consumed electricity or amount of generated power as reliable power metering data in a power transaction.

In operation 302, the power metering apparatus may generate a hash value of the power metering data by using a cryptographic hash algorithm. The power metering apparatus may generate a hash value of the power metering data expressed as a unique value having an encrypted form by abbreviating a characteristic of the power metering data.

In operation 303, the power metering apparatus may generate a digitally signed hash value by applying a public-key cryptography to the hash value of the power metering data. In other words, the power metering apparatus may perform a blockchain-based digital signature on the hash value generated to verify whether the power metering data is authentic.

In operation 304, the power metering apparatus may transmit, to a blockchain node, a digitally signed hash value for verifying whether the power metering data is authentic. The power metering apparatus may extract one or more digitally signed hash values generated by the power metering apparatus within a preset time period. The power metering apparatus may request the blockchain node to store the digitally signed hash values. In addition, the power metering apparatus may transmit, to the blockchain node, the one or more digitally signed hash values extracted via a blockchain network.

Here, the blockchain node may receive the one or more digitally signed hash values in response to a request of the power metering apparatus. The blockchain node may generate a transaction block including the received one or more digitally signed hash values. Here, the transaction block may be managed through a distributed ledger on the blockchain network.

Thereafter, the blockchain node may store, by connecting the generated transaction block, the digitally signed hash values in response to the request of the power metering apparatus. The blockchain network may allow blockchain nodes to propagate and replicate the transaction block to surrounding blockchain nodes, thereby sharing the distributed ledger containing the verified transaction block.

In operation 305, the power metering apparatus may transmit, to a power metering server, the power metering data and a unique key (a key for querying a digitally signed hash value of power metering data on a blockchain) as an original of the measured amount of power generated by the energy source. The power metering apparatus may extract one or more pieces of power metering data generated by the power metering apparatus within a preset time period. The power metering apparatus may transmit, to the power metering server, the extracted one or more pieces of power metering data and the unique key (a key for querying a digitally signed hash value of power metering data on a blockchain) while requesting the power metering server to store the extracted one or more pieces of power metering data and the unique key.

The power metering server may store, in response to the request of the power metering apparatus, the power metering data and the unique key (a key for querying a digitally signed hash value of power metering data on a blockchain) received from the power metering apparatus. When a request for access to the power metering data occurs from a power metering client, a permission to access the power metering data that the power metering client intends to access may be verified, and then the power metering data for which the permission is verified may be transmitted to the power metering client.

Figure 4:
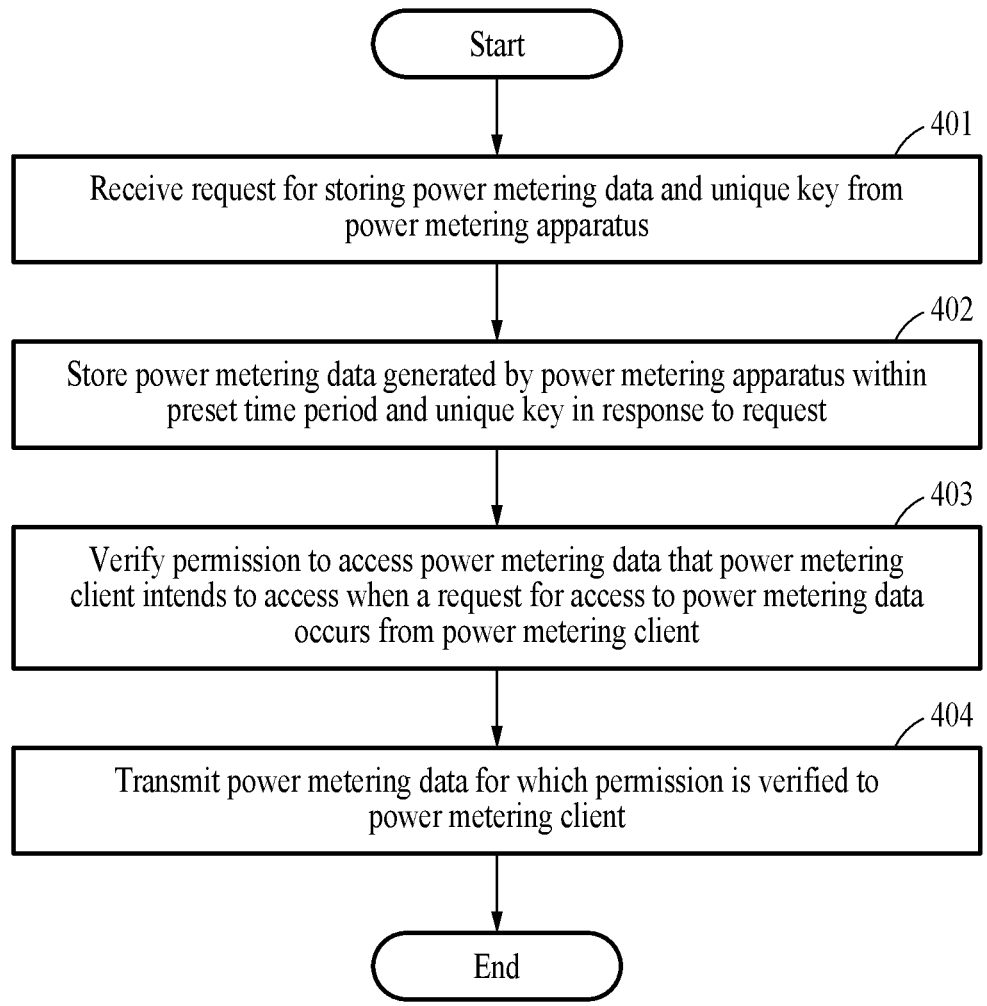
FIG. 4 is a flowchart illustrating a blockchain-based power metering method performed by a power metering server according to an example embodiment.

FIG. 4 is a flowchart illustrating a blockchain-based power metering method performed by a power metering server according to an example embodiment.

In operation 401, the power metering server may receive a request for storing power metering data and a unique key (a key for querying a digitally signed hash value of power metering data on a blockchain) from a power metering apparatus. The power metering apparatus may transmit, to the power metering server, the request for storing the power metering data so as to assure integrity and transparency of the power metering data as data of determining an amount of generated power. The power metering server may receive the request transmitted from the power metering apparatus.

In operation 402, the power metering server may store, in response to the request, one or more pieces of power metering data and a unique key (a digitally signed hash value of power metering data) generated by the power metering apparatus within a preset time period. When a request associated with storage of the power metering data is received from the power metering apparatus, the power metering server may transmit, to the power metering apparatus, an ACK signal in response to the received request.

The power metering apparatus may receive the ACK signal from the power metering server, and may transmit, in response to the received ACK signal, the power metering data and the unique key (a key for querying a digitally signed hash value of power metering data on a blockchain) to be stored to the power metering server.

The power metering server may receive, from the power metering apparatus, the power metering data and the unique key (a key for querying a digitally signed hash value of power metering data on a blockchain) to be stored. Thereafter, the power metering server may store, in response to the request of the power metering apparatus, the power metering data as an original in a database linked to the power metering server.

In operation 403, when a request for access to the power metering data occurs from a power metering client, the power metering server may verify a permission to access the power metering data that the power metering client intends to access.

The power metering server may transmit, to a blockchain network including blockchain nodes, a request to verify a digitally signed hash value corresponding to the power metering data requested for access by the power metering client. A blockchain node corresponding to the transmitted request among the blockchain nodes constituting the blockchain network may transmit, to the power metering server, the digitally signed hash value corresponding to the power metering data requested for access by the power metering client, which will be described in more detail with reference to FIG. 5.

When the power metering server receives the digitally signed hash value from the blockchain node corresponding to the request, whether the power metering data is authentic may be determined by using the digitally signed hash value. In other words, the power metering server may verify whether the power metering data stored in the power metering server corresponds to the original with assured integrity and transparency by using the digitally signed hash value, which will be described in more detail with reference to FIG. 6.

The power metering server may verify a permission of the power metering client to access the power metering data depending on whether the power metering data is authentic. In detail, by comparing hash values, the power metering server may verify whether a hash value of the stored power metering data and a decoded digitally signed hash value match. When the hash values match, the permission to access the power metering data requested by the power metering client may be granted. Conversely, when the hash values do not match, the permission of the power metering client to access the power metering data may be blocked.

In operation 404, the power metering server may transmit the power metering data requested by the power metering client of which permission is verified.

Figure 5:
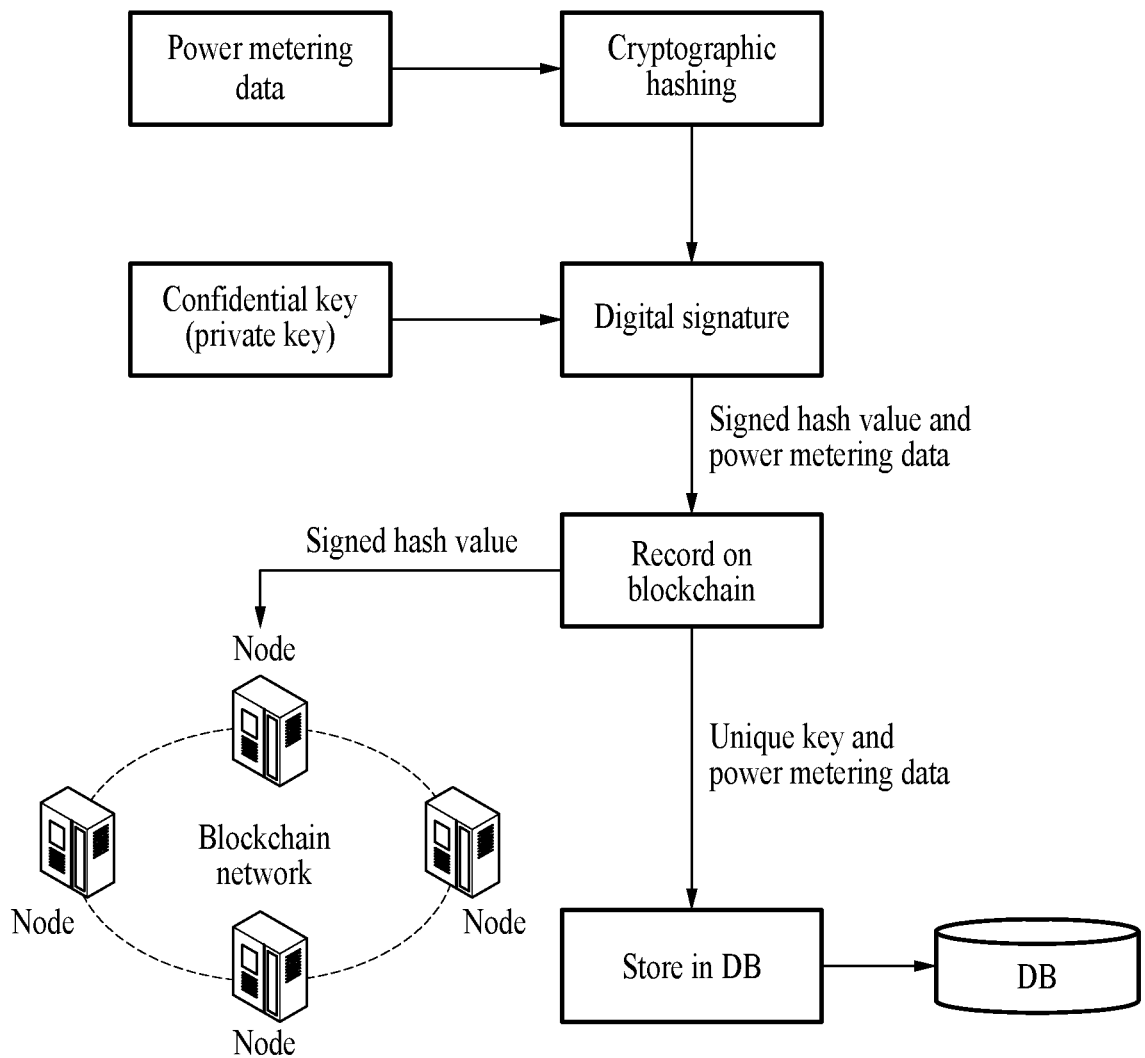
FIG. 5 is a diagram illustrating a process of storing power metering data and a hash value according to an example embodiment.

FIG. 5 is a diagram illustrating a process of storing power metering data and a hash value according to an example embodiment.

Referring to FIG. 5, a power metering server may perform a cryptographic hashing operation. The power metering server may receive power metering data as an input value and generate a hash value by encrypting the power metering data through a hash algorithm. Here, the hash algorithm may use SHA-256/512 (32/64 bit).

The power metering server may generate an encrypted hash value, that is, a digitally signed hash value. The power metering server may receive a hash value and a confidential key (private key) as input values and generate an encrypted hash value (that is, a digitally signed hash value) through encryption. Encryption and decryption functions may use an elliptic curve cryptosystem (ECC).

The power metering server may generate a unique key while storing the signed hash value in the blockchain so as to record the hash value on the blockchain. The unique key may be a unique key value indicating power metering data.

The power metering server may store the unique key in a database. The power metering server may record the power metering data and the unique key in the DB. After storing, the power metering server may query the signed hash value from the blockchain through the key so as to verify whether the power metering data is forged or tampered.

Figure 6:
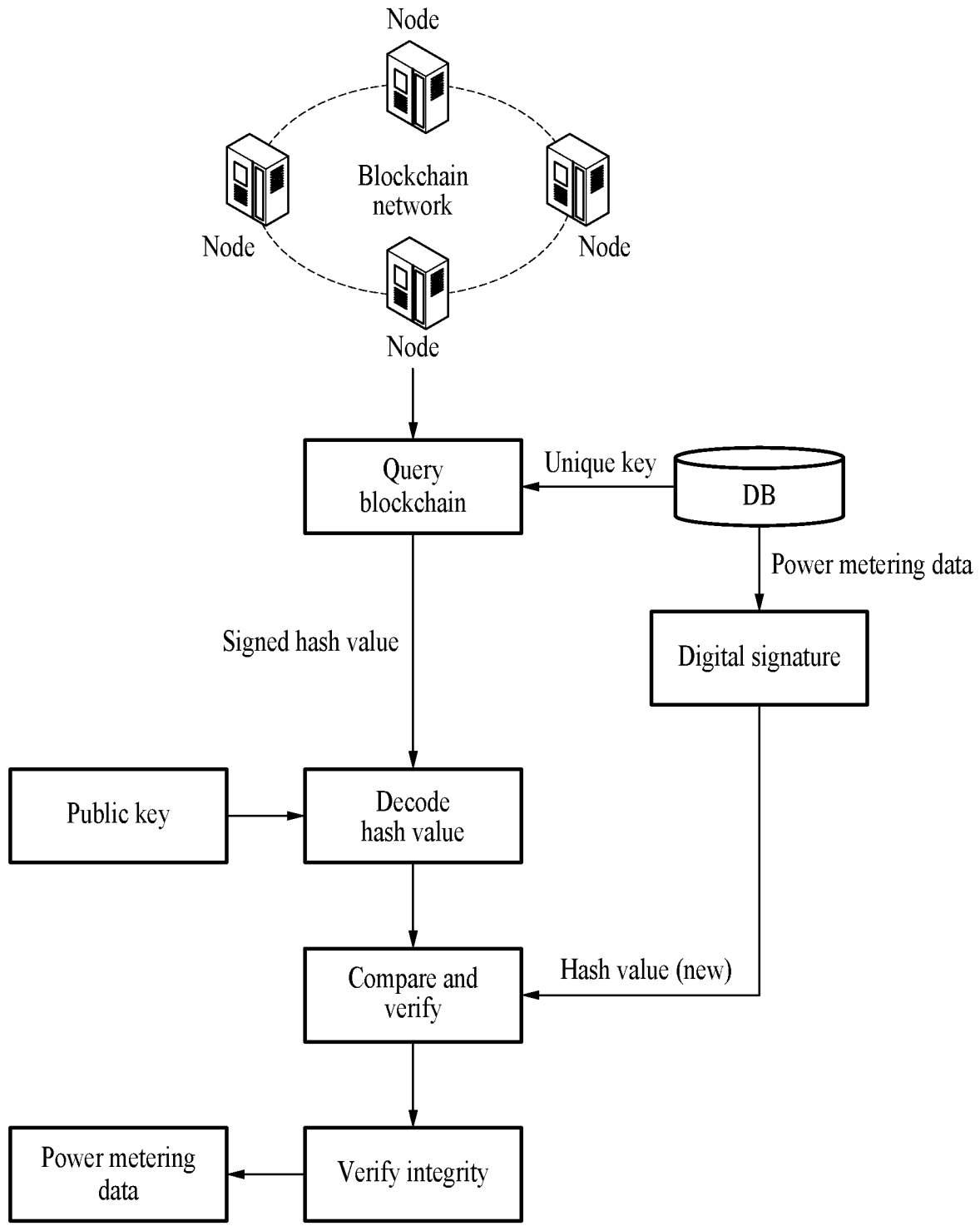
FIG. 6 is a diagram illustrating a process of querying power metering data and a hash value according to an example embodiment.

FIG. 6 is a diagram illustrating a process of querying power metering data and a hash value according to an example embodiment.

Referring to FIG. 6, a power metering server may query a blockchain. After receiving a unique key value from a DB, the power metering server may query the blockchain by using the unique key as a query key, thereby obtaining a signed hash value.

The power metering server may perform a cryptographic hashing operation. The power metering server may generate a hash value (new) by encrypting power metering data received from the DB through a hash algorithm. Here, the hash algorithm may use SHA-256.

The power metering server may decode the hash value. The power metering server may receive a public key and the signed hash value, and may obtain an original hash value (org) through decryption. Here, encryption and decryption algorithms may use an ECC.

The power metering server may perform comparison and verification. The power metering server may compare the original hash value (org) and the newly generated hash value (new) present in the blockchain to each other.

The power metering server may verify integrity. The power metering server may confirm that there is no forgery or tampering when the original hash value (org) and the newly generated hash value (new), that is, both hash values, completely match.

As described above, the integrity of managed data may be assured by using a characteristic of data stored in the blockchain being inherently unchangeable, and a one-way fixed-length encryption property of the hash algorithm.

The method according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, that is, a computer program tangibly embodied in an information carrier, for example, in a machine-readable storage device (for example, a computer-readable medium) or in a propagated signal for processing by, or to control an operation of a data processing apparatus, for example, a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. In general, a processor will receive instructions and data from a read-only memory or a random access memory or both. Elements of a computer may include at least one processor to execute instructions and one or more memory devices to store instructions and data. In general, a computer will also include or be coupled to receive data from, transfer data to, or perform both on one or more mass storage devices to store data, for example, magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), and the like, and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

In addition, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products.

It should be understood that example embodiments disclosed herein are merely illustrative and are not intended to limit the scope of the invention. It will be apparent to those skilled in the art that various modifications of the example embodiments may be made without departing from the spirit and scope of the claims and their equivalents.

What is claimed is:

1. A blockchain-based power metering method performed by a power metering apparatus, the method comprising:
   generating power metering data by measuring an amount of power generated by an energy source;
   generating a hash value of the power metering data by using a hash algorithm;
   generating a digitally signed hash value by applying a confidential key (private key) of the power metering apparatus based on a public-key cryptography to the hash value of the power metering data;
   transmitting, to a blockchain node, a digitally signed hash value for verifying whether the power metering data is authentic; and
   transmitting, to a power metering server, the power metering data and a unique key as an original of the measured amount of power generated by the energy source,
   wherein the unique key, which is a key for querying the digitally signed hash value of the power metering data on a blockchain, includes a power metering apparatus ID and a blockchain transaction ID.

2. The method of claim 1, wherein the transmitting to the blockchain node comprises:
   extracting one or more digitally signed hash values generated by the power metering apparatus within a preset time period; and
   transmitting, to the blockchain node, the extracted one or more digitally signed hash values while requesting the blockchain node to store the extracted one or more digitally signed hash values.

3. The method of claim 1, wherein the blockchain node is configured to:
   receive, in response to a request of the power metering apparatus, one or more digitally signed hash values;
   generate a transaction block including the received one or more digitally signed hash values; and
   connect and store the generated transaction block.

4. The method of claim 3, wherein:
   the transaction block is managed through a distributed ledger on a blockchain network, and
   the blockchain network performs a function of sharing a same distributed ledger by allowing the blockchain nodes to propagate and replicate the transaction block to surrounding blockchain nodes.

5. The method of claim 1, wherein the transmitting to the power metering server comprises:
   extracting one or more pieces of power metering data generated by the power metering apparatus within a preset time period; and
   transmitting, to the power metering server, the extracted one or more pieces of power metering data and the unique key while requesting the power metering server to store the extracted one or more pieces of power metering data and the unique key.

6. The method of claim 1, wherein the power metering server is configured to:
   store, in response to a request of the power metering apparatus, the power metering data and the unique key received from the power metering apparatus; and
   verify, when a request for access to the power metering data occurs from a power metering client, a permission to access the power metering data that the power metering client intends to access, and then transmit, to the power metering client, the power metering data for which the permission is verified.

7. A power metering apparatus comprising a processor, wherein the processor is configured to:
   generate power metering data by measuring an amount of power generated by an energy source;
   generate a hash value of the power metering data by using a hash algorithm;
   generate a digitally signed hash value by applying a confidential key (private key) of the power metering apparatus based on a public-key cryptography to the hash value of the power metering data;
   transmit, to a blockchain node, a digitally signed hash value for verifying whether the power metering data is authentic; and
   transmit, to a power metering server, the power metering data and a unique key as an original of the measured amount of power generated by the energy source,
   wherein the unique key, which is a key for querying the digitally signed hash value of the power metering data on a blockchain, includes a power metering apparatus ID and a blockchain transaction ID.

8. The power metering apparatus of claim 7, wherein the processor is configured to generate, by abbreviating a characteristic of the power metering data, a hash value of the power metering data expressed as a unique value having an encrypted form.

9. The power metering apparatus of claim 7, wherein the processor is configured to perform a blockchain-based digital signature on the generated hash value so as to verify whether the power metering data is authentic.

10. The power metering apparatus of claim 7, wherein the processor is configured to:
    extract one or more digitally signed hash values generated by the power metering apparatus within a preset time period; and
    transmit, to the blockchain node, the extracted one or more digitally signed hash values while requesting the blockchain node to store the extracted one or more digitally signed hash values.

11. The power metering apparatus of claim 7, wherein the processor is configured to:
    extract one or more pieces of power metering data generated by the power metering apparatus within a preset time period; and
    transmit, to the power metering server, the extracted one or more pieces of power metering data and the unique key while requesting the power metering server to store the extracted one or more pieces of power metering data and the unique key.

12. A blockchain-based power metering method performed by a power metering server, the method comprising:
    receiving a request to store power metering data and a unique key from a power metering apparatus;
    storing, in response to the request, one or more pieces of power metering data generated by the power metering apparatus within a preset time period and the unique key;
    verifying, when a request to access to the power metering data is received from a power metering client, a permission to assess the power metering data that the power metering client intends to access; and
    transmitting, to the power metering client, the power metering data for which the permission is verified,
    wherein the verifying of the permission comprises:
        requesting a digitally signed hash value corresponding to the power metering data of the power metering apparatus requested by the power metering client.

13. The method of claim 12, wherein the verifying of the permission further comprises:
    decoding the digitally signed hash value by using a public key of the power metering apparatus provided by the power metering client, and then determining, by comparing the decoded hash value to a hash value of the power metering data, whether the decoded hash value and the hash value of the power metering data match; and
    determining whether the power metering client is allowed to access the power metering data according to a determination result.

14. The method of claim 13, wherein the digitally signed hash value is included in a transaction block generated by a blockchain node to be managed through a distributed ledger shared by blockchain nodes on a blockchain network.

* * * * *